United States Patent

[11] 3,593,130

[72] Inventor Helmut Trautmann
 Dresden, Germany
[21] Appl. No. 764,100
[22] Filed Oct. 1, 1968
[45] Patented July 13, 1971
[73] Assignee Arbeitsstelle fur Molekularelektronik
 Konigsbrucker Landstrasse
 Dresden, Germany

[54] CIRCUIT FOR A SORTING UNIT OF A PROGRAMMED AUTOMATIC MEASURING DEVICE ESPECIALLY ADAPTED FOR TESTING OF INTEGRATED CONTROL CIRCUITS
 3 Claims, 4 Drawing Figs.
[52] U.S. Cl. ................................................ 324/73 R
[51] Int. Cl. ........................................... G01r 17/02
[50] Field of Search .................................. 324/73,
 133; 328/93, 159; 307/216

[56] References Cited
UNITED STATES PATENTS
| | | | |
|---|---|---|---|
| 3,345,522 | 10/1967 | Reuther | 324/738 X |
| 3,286,175 | 11/1966 | Gerbier | 324/73 |
| 3,398,363 | 8/1968 | Mortley | 324/73 |

Primary Examiner—Alfred E. Smith
Attorney—Nolte and Nolte

ABSTRACT: A circuit for a programmed automatic measuring device, especially for integrated circuit testers comprising a plurality of input logics for determining the conformity of measured test results with predetermined standards, with two parallel AND gates, one with input negation, and an OR gate with output negation arranged in series with the AND gates; flip-flops in series with the input logics; and means for automatically conforming the test result to the respective standard if the respective test results is not to be evaluated.

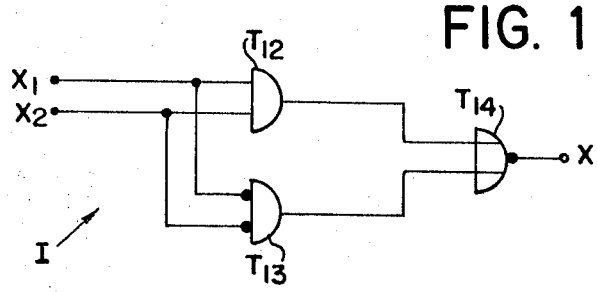
FIG. 1
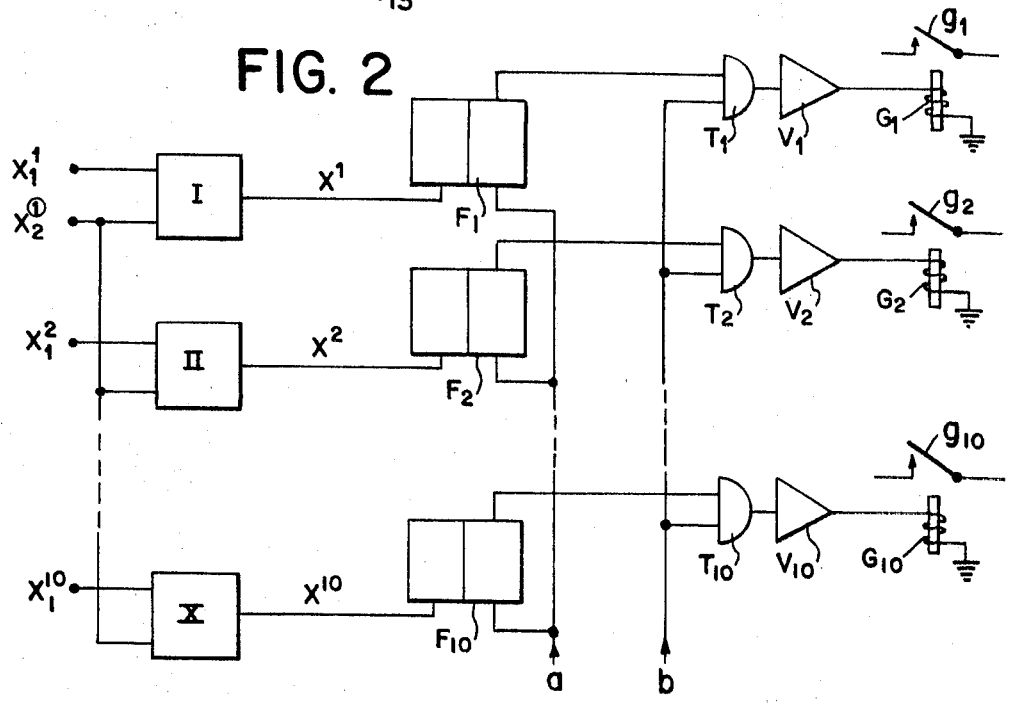
FIG. 2
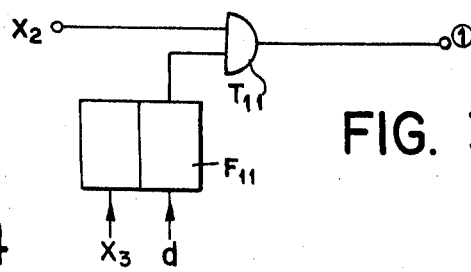
FIG. 3
FIG. 4
INVENTOR
HELMUT TRAUTMANN

CIRCUIT FOR A SORTING UNIT OF A PROGRAMMED AUTOMATIC MEASURING DEVICE ESPECIALLY ADAPTED FOR TESTING OF INTEGRATED CONTROL CIRCUITS

BACKGROUND OF THE INVENTION

The present invention relates to an automatic sorting device of the type employed for instance for testing integrated logic circuits. This sorting device is also suitable for standardizing transistors, especially in automatic measuring devices with one measuring point.

Sorting devices have become known which store all the yes/no decisions of a test cycle in the complete testing of a unit and which at the end of the test cycle compare the decisions with predetermined class characteristics which have been stored and which correspond to the different classes of the unit.

One of the disadvantages of this type of sorting device is that it requires a considerable amount of electronic equipment and expense for obtaining the desired results.

It is, therefore, an object of the present invention to eliminate the above-mentioned disadvantage of heretofore-known sorting devices.

It is another object of the present invention to provide a sorting device, especially for programmed measuring automats, which does not require electronic equipment of a complex nature as was heretofore necessary.

It is still another object of the present invention to provide a sorting device for programmed automatic measuring devices with one measuring point, especially for integrated circuit testers in which the storing of the yes/no decisions during a test cycle can be dispensed with.

BRIEF SUMMARY OF THE INVENTION

In its broadest aspects, the invention is characterized and the above-mentioned problems have been eliminated, by providing a sorting device in which the decision whether a certain characteristic belongs or conforms to a certain class is made immediately after each testing step so that the decisions do not have to be stored and compared with a standard at the end of the complete test cycle that is, tests indicating coincidence in a class during a measuring cycle do not change the state of a storing device, and only the first test during a measuring cycle that indicates noncoincidence in a given class is stored.

Structurally, the sorting device comprises a plurality of input logics, for determining the conformity of measured test results with predetermined standards, with two parallel AND gates, one with input negation, and an OR gate with output negation, arranged in series with the AND gates; flip-flops in series with the input logics; and means for automatically conforming the test result to the respective standard if the respective test result is not to be evaluated.

BRIEF DESCRIPTION OF THE DRAWING

The invention is illustrated by way of example in the enclosed drawing, in which:

FIG. 1 shows the input logic of a sorting device according to the present invention;

FIG. 2 diagrammatically illustrates the sorting device according to the invention;

FIG. 3 illustrates the circuit arrangement of the sorting device if a certain parameter is not to be evaluated during the testing; and FIG. 4 illustrates the program for four current-amplifying classes and one nonevaluated parameter.

DETAILED DESCRIPTION OF A PREFERRED EMBODIMENT

REferring now to the drawing in detail and FIG. 2 thereof in particular, the class-sorting device shown therein is designed for a plurality of classes, for instance ten classes. For each desired class one input logic each I....x, one flip-flop each F1.....F10, one AND gate each T1....T10, one signal amplifier each V1....V10 and one relay each G1...G10 is provided and required.

Each input logic I....X in turn, consists of an AND gate T12 (See FIG. 1) which is arranged in parallel with an AND gate T13 with negation of both of its inputs. Both gates lead to an OR gate T14 with negation of the output, arranged in series therewith. Finally, independently of the number of classes used in the sorting process, a circuit according to FIG. 3 is provided and required consisting of an AND gate T11 and a flip-flop F11, for use in the circuit in case one parameter is not to be evaluated.

During the actual testing operation, the result of a test (good or bad) is transmitted to the input logics I....X of the classes in the form of a signal X2 can have the logic state O or the logic state 1. Simultaneously with each signal X2, each input logic I....X is fed with a signal X1 which contains the information about the class membership or characteristics of the particular class. The signal X1 is transmitted to each input logic I....X of the corresponding class separately ($X1^7$....$X1^{10}$). For purposes of characterizing the class membership of a good or bad test result involving a single measured parameter, one bit is required for each class.

Depending on the signals $X1^{(1....10)}$ and X2, signals $X^{(1....10)}$ are formed at the output of the input logics I....X. The signal X of the corresponding class is O if there exists a class membership, i.e., if the signals received are alike, and equals 1 if the signal does not belong to this class.

The flip-flops F1...F10 arranged in series to the input logics I....X remain in their rest positions as long as the respective signal X is O. However, if the signal X has the value 1, the subsequent flip-flop flips into its other stable position.

AND gates T1...T10, signal amplifiers V1...V10 and relays G1...G10 with contacts g1...g10 are arranged in series following flip-flops F1...F10.

During the sorting operation the AND gates T1...T10 are blocked via the line b.

The "examination or interrogation" about class membership is effected at the end of the test cycle by opening gates T1...T10. However, via the amplifiers V1...V10 only that relay G1...G10 can react which corresponds to the respective class, since the remaining flip-flops are in the other stable position.

Prior to the start of a new test cycle, the flip-flops are returned to their rest position via line a.

If a parameter is not to be used in the classification, the circuit according to FIG. 3 is provided in the common signal line X2 in front of the input logics I...X. If the flip-flop F11 according to FIG. 3 is in rest position, the signals X2 are transmitted to the input logics I....X and the classification process is carried out as outlined above. If a parameter is not to be taken into consideration, the flip-flop F11 is brought into the other stable position by a restoring signal X3 and the AND gate T11 is blocked.

The input logics obtain a signal 0. If the signals $X1^7$...$X1^{10}$ are likewise programmed with zero, the corresponding parameter is evaluated as belonging to all classes.

At the end of the test cycle, by means of a reset impulsed, the rest position of the flip-flop F11 (See FIG. 3) is restored.

FIG. 4 is a Table illustrating the operation of the system of the invention in the sorting of two elements into four current amplification classes. In these examples, the first four tests, i.e. tests 1—4 in the upper portion of the Table, correspond to the first device, and tests 1—4 at the bottom of the Table correspond to the second device. Thus, each series of four tests constitutes a measuring cycle. The column X2 corresponds to the binary results of the associated tests as applied to the input terminal X2.

The column X3 indicates the binary state of the signal X3 applied to flip-flop F11. The columns $X_1^1$ to $X_1^4$ indicate the binary signals applied to the corresponding input terminals during each test. The columns $X^1$—$X^4$ indicate the binary outputs on the corresponding lines as illustrated in FIG. 2. Since the fliplflops corresponding to the four channels are set by the terminal A, it is apparent that an output to the relay corresponding to each channel will occur only if the signal on the corresponding line $X^1-X^4$ is maintained at a zero state throughout all of the tests. In FIG. 4, this condition is met with respect to the first element only in the column $X^2$, so that the system has selected the class corresponding thereto. Similarly, in the second example tested in FIG. 4, the system indicates that the element belongs to the class corresponding to $X^4$. As an example, the tests of FIG. 4 correspond to the sorting of amplifying elements into the four classes: B greater than 40, B between 30 and 40, B between 20 and 30, and B less than 20, where B is the current amplification factor of the elements. In each of the test examples, the fourth test was rejected, by use of the signal X3 and hence the circuit of FIG. 3. The measurements of each measuring cycle thus correspond only to the first three tests for each device.

While a particular embodiment of this invention has been shown and described, it will be obvious to those skilled in the art that various changes and modifications may be made without departing from this invention in its broader aspects and, therefore, it is intended that the appended claims cover all such changes and modifications as fall within the true spirit and scope of this invention.

What I claim:

1. A circuit for an automatic measuring device, especially for testing integrated circuits, comprising a plurality of input logic means for determining the conformity of measured test results each being represented by a binary bit, means connected in common to each of said input logic means for conveying said test results thereto, and means individually coupling to each of said input logic means a bit representing a class of such standards, each input logic means comprising two AND gates arranged in parallel to each other, and an OR gate arranged in series with said AND gates, one of said AND gates having input negating means and said OR gate having output negating means, and means connected to the output of said input logic means for producing an output signal representing a class when said bits correspond.

2. A circuit according to claim 1, which comprises a plurality of flip-flop means respectively arranged in series with said input logic means and each having two stable positions, each of said flip-flop means being adapted to flip from one stable position to its other stable position upon the respective test result nonconforming to said predetermined standard.

3. A circuit according to claim 2, comprising means common to said plurality of input logic means for selectively conforming all of said measured test results to the standard, wherein said common means includes a conductor, a gate in said conductor, a flip-flop connected to said last-mentioned gate, memory means and return impulse means both connected to said flip-flop.